US009825487B2

(12) United States Patent
Ito et al.

(10) Patent No.: US 9,825,487 B2

(45) Date of Patent: Nov. 21, 2017

(54) APPARATUS AND ELECTRIC POWER CONTROL METHOD

(71) Applicant: Panasonic Corporation, Osaka (JP)

(72) Inventors: Motoshi Ito, Osaka (JP); Shoichi Toya, Hyogo (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 557 days.

(21) Appl. No.: 14/368,612

(22) PCT Filed: Oct. 15, 2013

(86) PCT No.: PCT/JP2013/006121

§ 371 (c)(1),
(2) Date: Jun. 25, 2014

(87) PCT Pub. No.: WO2014/068875

PCT Pub. Date: May 8, 2014

(65) Prior Publication Data

US 2015/0108833 A1 Apr. 23, 2015

(30) Foreign Application Priority Data

Oct. 31, 2012 (JP) ................................. 2012-240630

(51) Int. Cl.
*H02J 1/10* (2006.01)
*H02J 9/06* (2006.01)
(Continued)

(52) U.S. Cl.
CPC .............. *H02J 9/061* (2013.01); *H02J 3/383* (2013.01); *H02J 3/387* (2013.01); *H02J 7/0063* (2013.01);
(Continued)

(58) Field of Classification Search
CPC ........................................................ H02J 9/061
See application file for complete search history.

(56) References Cited

U.S. PATENT DOCUMENTS

2011/0291483 A1* 12/2011 Yamane .................... H02J 7/35
307/65
2012/0267957 A1* 10/2012 Czarnecki ................. H02J 3/02
307/64
(Continued)

FOREIGN PATENT DOCUMENTS

EP 2 600 487 A1 6/2013
JP 2-41603 3/1990
(Continued)

OTHER PUBLICATIONS

International Search Report dated Dec. 10, 2013 in corresponding International Application No. PCT/JP2013/006121.

*Primary Examiner* — Daniel Cavallari
(74) *Attorney, Agent, or Firm* — Wenderoth, Lind & Ponack, L.L.P.

(57) ABSTRACT

An apparatus includes: a storage battery including one or more storage batteries and electrically connected to a predetermined load; a detector which detects a power outage state in which no electric power is being supplied from a power system; a first switch between the power system and the storage battery; and a controller which controls at least the first switch. When the detector detects the power outage state, the controller turns off the first switch to electrically disconnect the storage battery and the power system, and the storage battery causes the one or more storage batteries to discharge and supplies electric power to the controller and the predetermined load.

13 Claims, 12 Drawing Sheets

(51) Int. Cl.

| | |
|---|---|
| ***H02J 3/38*** | (2006.01) |
| ***H02J 7/34*** | (2006.01) |
| ***H02J 7/35*** | (2006.01) |
| ***H02J 7/00*** | (2006.01) |

(52) U.S. Cl.

CPC *H02J 7/34* (2013.01); *H02J 7/35* (2013.01); *H02J 9/062* (2013.01); *Y02B 10/72* (2013.01); *Y02B 90/14* (2013.01); *Y02E 10/563* (2013.01); *Y02E 10/566* (2013.01); *Y10T 307/344* (2015.04); *Y10T 307/625* (2015.04)

(56) References Cited

U.S. PATENT DOCUMENTS

| | | | | |
|---|---|---|---|---|
| 2014/0361725 | A1* | 12/2014 | Nishikawa ................ | H02J 9/06 320/101 |
| 2015/0108853 | A1 | 4/2015 | Matsuura | |

FOREIGN PATENT DOCUMENTS

| | | |
|---|---|---|
| JP | 2001-258176 | 9/2001 |
| JP | 2004-282802 | 10/2004 |
| JP | 2007-43802 | 2/2007 |
| JP | 2008-22650 | 1/2008 |
| JP | 2008-48469 | 2/2008 |
| JP | 2011-188607 | 9/2011 |
| JP | 2012-143046 | 7/2012 |
| JP | 2013-252012 | 12/2013 |
| JP | 2014-110702 | 6/2014 |
| WO | 2012/014410 | 2/2012 |
| WO | 2013/179731 | 12/2013 |

* cited by examiner

| SB-PCS | PV-PCS | FC | Power company | Current transformer 432 | Determination result |
|---|---|---|---|---|---|
| Power outage | – | – | – | – | Power outage |
| Unknown | Power outage | – | – | – | Power outage |
| Unknown | Unknown | Power outage | – | – | Power outage |
| Unknown | Unknown | Unknown | Power outage | – | Power outage |
| Unknown | Unknown | Unknown | Unknown | Power outage or unknown | Power outage |
| Other than power outage | Other than power outage | Other than power outage | Supply | Other than power outage | Supply |

| PV-PCS | SB-PCS | FC | Current transformer 432 | Determination result |
|---|---|---|---|---|
| Power outage | – | – | – | Power outage |
| Unknown | Power outage | – | – | Power outage |
| Unknown | Unknown | Power outage | – | Power outage |
| Unknown | Unknown | Unknown | Power outage or unknown | Power outage |
| Unknown | Unknown | Unknown | Supply | Supply |
| Unknown | Unknown | Supply | Other than power outage | Supply |
| Unknown | Supply | Other than power outage | Other than power outage | Supply |
| Supply | Other than power outage | Other than power outage | Other than power outage | Supply |

712

APPARATUS AND ELECTRIC POWER CONTROL METHOD

TECHNICAL FIELD

The present invention relates to a distribution board which supplies, to a load, AC power that is supplied from a power system, and an electric power control method performed by the distribution board.

BACKGROUND ART

Patent Literature (PTL) 1 discloses a self-sustained operation assist device which enables self-sustained operation of a fuel cell system during power outage.

CITATION LIST

Patent Literature

[PTL 1] Japanese Unexamined Patent Application Publication No. 2008-22650

SUMMARY OF INVENTION

Technical Problem

In a state where no electric power (hereinafter, electric power is simply referred to as power) is supplied from a power system (power outage state), an apparatus needs to be switched into a self-sustained state where no power that is supplied from the power system is used. However, it is not possible to appropriately detect the power outage state and switch into the self-sustained state.

In addition, there is a limit in use of power for operating the apparatus in the self-sustained state.

In view of this, the present invention provides an apparatus and the like which appropriately detect the power outage state and switch into the self-sustained state.

The present invention also provides an apparatus and the like which have wider use of power for operating the apparatus.

Solution to Problem

An apparatus according to one aspect of the present invention includes: a power line for supplying, to a load, AC power that is supplied from a power system; a power storage including one or more storage batteries and electrically connected to a predetermined load; a detector which detects a power outage state in which no electric power is being supplied from the power system; a first switch between the power system and the power storage; and a controller which controls at least the first switch. When the detector detects the power outage state, the controller turns off the first switch to electrically disconnect the power storage and the power system, and the power storage causes the one or more storage batteries to discharge; supplies electric power to the controller to drive the controller; and supplies discharge power of the one or more storage batteries to the predetermined load.

These general and specific aspects may be implemented using a system, a method, an integrated circuit, a computer program, or a computer-readable recording medium such as a compact disc read only memory (CD-ROM), or any combination of systems, methods, integrated circuits, computer programs, or computer-readable recording media.

Advantageous Effects of Invention

An apparatus according to one aspect of the present invention can automatically detect power outage, and switch into the self-sustained state. The apparatus also has wider use of power for operating the apparatus.

BRIEF DESCRIPTION OF DRAWINGS

FIG. 7 illustrates a first example of a determination table of a detecting state of the distribution board according to Embodiment 2.

FIG. 8 illustrates a second example of a determination table of a detecting state of the distribution board according to Embodiment 2.

DESCRIPTION OF EMBODIMENTS (Underlying Knowledge Forming Basis of the Present Invention)

Recent years have seen a widespread use of a photovoltaics (PV) system, a fuel cell (FC) and the like also at conventional homes. The inventors of the present application found out the following problems related to such techniques.

Figure 1:
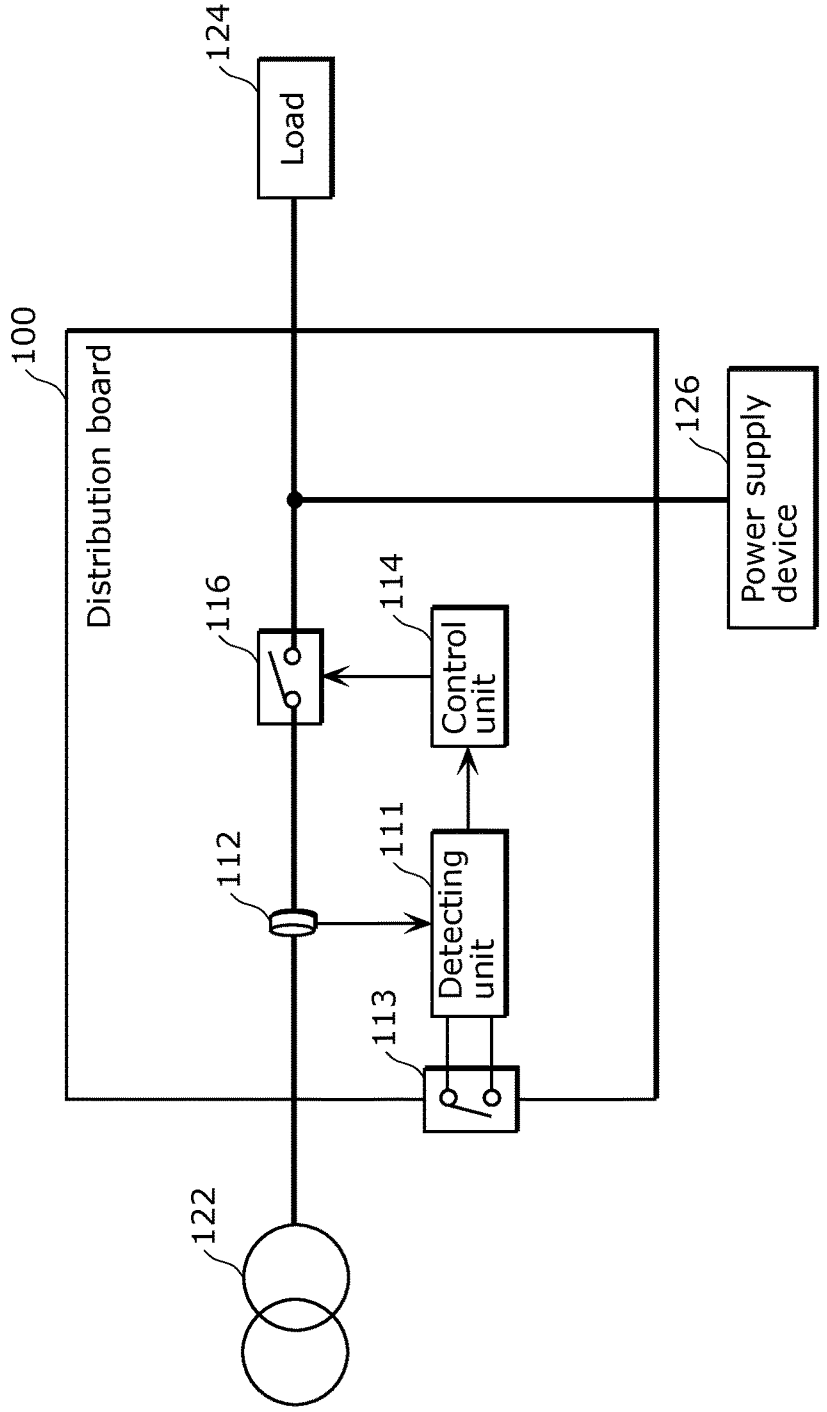
FIG. 1 is a functional block diagram of a distribution board according to an assumed technique.

FIG. 1 is a functional block diagram of a distribution board 100 according to an assumed technique.

The distribution board 100 according to the assumed technique receives power from a power system 122 and a power supply device 126, and supplies the received power to a load 124. The distribution board 100 supplies, to the load 124, the power that is supplied from the power system 122 and the power supply device 126, in a state where power is supplied from the power system 122 (supply state). On the other hand, in a state where no power is supplied from the power system 122 (power outage state), the distribution board 100 supplies, to the load 124, the power supplied from the power supply device 126. Here, such a control is performed that power that is supplied from the power supply device 126 is not provided to the power system 122 (reverse power flow). More specifically, in the power outage state, the distribution board 100 needs to control switching into the self-sustained state where no power that is supplied from the power system 122 is used.

As FIG. 1 illustrates, the distribution board 100 according to the assumed technique includes a detecting unit (detector) 111, a current transformer 112, a self-sustained operation switch 113, a control unit (controller) 114, and a switch 116.

The detecting unit 111 detects a power outage state based on a measurement value of the current transformer 112 or the state of the self-sustained operation switch 113 (on or off).

The current transformer 112 is a power sensor which measures current passing through the current transformer 112 and outputs a measurement value (a current value). In the power outage state, the value of the current passing through the current transformer 112 is 0. In the supply state, the current passing through the current transformer 112 has a value different from 0. More specifically, the power outage state or the supply state is detected based on whether the current value measured by the current transformer 112 is 0.

The self-sustained operation switch 113 is a switch for a user to designate whether the present state is a power outage state. The self-sustained operation switch 113 can be operated by a user. For example, the self-sustained operation switch 113 is turned on in the power outage state, and is turned off in the supply state. When a user of the distribution board 100 notices that no power is being supplied from the power system 122, the user turns on the self-sustained operation switch 113, and then, when the user notices that power is being supplied from the power system 122, the user turns off the self-sustained operation switch 113.

The control unit 114 causes the power line connecting the power system 122 and the load 124 to be non-conductive, when the detecting unit 111 detects the power outage state. More specifically, the control unit 114 causes the power line connecting the power system 122 and the load 124 to be non-conductive by turning off the switch 116, when the detecting unit 111 detects the power outage state.

The switch 116 is located on the power line connecting the power system 122 and the load 124, and causes the power line to be conductive when turned on, and causes the power line to be non-conductive when turned off.

In such a configuration, the current transformer 112 needs to be highly accurate. This results in a high cost of the distribution board 100. Furthermore, since the self-sustained operation switch 113 is operated by a user, it is unlikely that such a control is performed that the distribution board 100 detects the power outage state and automatically switches into an operation in a power outage mode. In other words, in the assumed technique, a method achieved at a low cost cannot detect the power outage state appropriately.

Patent Literature (PTL) 1 discloses a self-sustained operation assist device which enables self-sustained operation of a fuel cell system during power outage. However, PTL 1 does not disclose a method of detecting a power outage state appropriately at a low cost.

In addition, in the case where a distribution board includes a storage battery for operating the distribution board in the self-sustained state, for example, there is a limit in use of the power of the storage battery.

In order to solve the above problems, a distribution board according to one aspect of the present invention includes: a power line for supplying, to a load, AC power that is supplied from a power system; a power storage including one or more storage batteries and electrically connected to a predetermined load; a detector which detects a power outage state in which no electric power is being supplied from the power system; a first switch between the power system and the power storage; and a controller which controls at least the first switch. When the detector detects the power outage state, the controller turns off the first switch to electrically disconnect the power storage and the power system, and the power storage: causes the one or more storage batteries to discharge; supplies electric power to the controller to drive the controller; and supplies discharge power of the one or more storage batteries to the predetermined load.

With this, in the power outage state or the like, power of the storage battery included in the distribution board can be used for controlling the distribution board and can also be supplied to a predetermined load.

Furthermore, it may be that the power storage further includes: a DC terminal electrically connected to the controller and the one or more storage batteries; an AC terminal electrically connected to the predetermined load and the first switch; and a DC/AC inverter which converts DC power provided from the one or more storage batteries into AC power, and provides the AC power to the AC terminal, and during power outage, the power storage supplies, to the controller via the DC terminal, the DC power provided from the one or more storage batteries, the DC/AC inverter converts the DC power provided from the one or more storage batteries into AC power, and the power storage supplies the AC power to the predetermined load via the AC terminal.

With this, in the power outage state or the like, for example, DC power can be supplied to control the distribution board, and AC power can be supplied to a predetermined load.

Furthermore, it may be that the DC/AC inverter further converts AC power into DC power to enable bi-directional conversion between DC power and AC power, and when electric power is being supplied from the power system to the distribution board, the controller turns on the first switch to electrically connect the AC terminal and the power system, and the DC/AC inverter converts the AC power supplied from the power system via the AC terminal into DC power, and the power storage supplies the DC power to the one or more storage batteries to charge the one or more storage batteries.

With this, when power is being supplied from the power system to the distribution board, the storage battery can be charged.

Furthermore, it may be that when electric power is being supplied from the power system to the distribution board, the controller turns on the first switch to electrically connect the AC terminal and the power system, the DC/AC inverter converts the AC power supplied from the power system via the AC terminal into DC power, and the power storage supplies the DC power to the controller via the DC terminal, and the controller is driven with the DC power supplied from the power storage.

With this, when power is being supplied from the power system to the distribution board, DC power can be supplied to control the distribution board.

Furthermore, it may be that wherein the detector detects power restoration indicating a change from the power outage state to a supply state in which electric power is being supplied from the power system, and the power storage supplies, according to a voltage of the power system, electric power from the power storage to the controller for a predetermined period after the detector detects the power restoration.

With this, supply of power for controlling the distribution board can be stabilized. In this case, the power storage unit (power storage) functions as a smoothing capacitor when power is restored. As a result, it is possible to avoid an increase in the number of components within the distribution board caused due to separately providing a large-capacity capacitor.

Furthermore, it may be that the distribution board is connected to a normal load and an emergency load, the predetermined load is the emergency load, and the power storage supplies, to the emergency load, discharge power of the power storage during power outage.

With this, it is possible to supply discharge power of the power storage unit to the emergency load during power outage.

Furthermore, it may be that the distribution board is connected to a normal load and an emergency load, the predetermined load is the emergency load, and when electric power is being supplied from the power system to the distribution board, the controller supplies, to the normal load, the electric power that is supplied from the power system.

With this, while the distribution board is receiving power supply from the power system, the power that is supplied from the power system can be supplied to a normal load.

Furthermore, it may be that the distribution board further supplies, to the load, AC power that is supplied from at least one power supply device externally provided, the at least one power supply device includes a first power output terminal and a second power output terminal, supplies electric power to the distribution board via the first power output terminal during power outage, and supplies electric power to the distribution board via the second power output terminal during a normal period, the distribution board further includes a second switch for switching between conduction and non-conduction between the at least one power supply device and the predetermined load, the first switch further switches between conduction and non-conduction between the power system and the predetermined load, the detector detects the power outage state by receiving, from the at least one power supply device, a power outage notification signal indicating that the at least one power supply device has detected that no electric power is to be supplied from the power system, when the detector receives the power outage notification signal, the controller turns off the first switch to block electric power from the power system, and turns on the second switch to electrically connect the first power output terminal of the at least one power supply device and the predetermined load, the second power output terminal of the at least one power supply device is connected to the predetermined load via the first switch, when the first switch is on, the at least one power supply device is electrically connected to the predetermined load, and when the first switch is off, the at least one power supply device is electrically disconnected from the predetermined load.

Here, it may be that the first switch and the second switch may be formed as a single switch element.

It may also be that the first switch and the second switch are two different switch elements.

With this, the distribution board can detect the power outage state by the power supply device that includes a highly accurate power sensor detecting the power outage. When the power outage state is detected, it is possible to perform control such that power that is supplied form the power supply device can be supplied to a load, by switching a switch in the distribution board. As a result, power outage can be appropriately detected by a low-cost method.

Furthermore, it may be that the power line is connected to two or more power supply devices among the at least one power supply device at different connecting points, and the detector detects the power outage state by receiving the power outage notification signal from one of the two or more electric power supply devices that is connected to the power line at a connecting point closest to the power system.

With this, when a plurality of power supply devices are connected to a distribution board, power outage can be detected more accurately. The amount of noise included in power that is supplied from the power system increases as a distance from a point on the power line to the power system increases. Hence, a power supply device connected at a connecting point closer to the power system can detect the power outage state more accurately. As a result, the power outage state can be detected more accurately.

Furthermore, it may be that when the at least one power supply device includes a plurality of power supply devices, the detector detects the power outage state by receiving the power outage notification signal from one of the power supply devices that has a reliability level highest among plural reliability levels, each of the plural reliability levels being predetermined for a different one of the power supply devices based on an attribute of the different one of the power supply devices.

With this, when a plurality of power supply devices are connected to a distribution board, power outage can be detected more accurately. This is because a power outage notification signal received from a power supply device having a higher reliability level is considered to be more accurate. As a result, the power outage state can be detected more accurately.

Furthermore, it may be that the detector further detects power restoration indicating a change from the power outage state to a supply state in which electric power is being supplied from the power system, and when the detector detects the power restoration, the controller turns off the second switch to establish non-conduction between the first power output terminal of the at least one power supply device and the predetermined load, and turns on the first switch to establish conduction between the power system and the predetermined load.

With this, the first switch and the second switch in the distribution board are switched when it is detected that the power system has been changed from the power outage state to the supply state, so that such a control can be performed that power that is supplied both from the power system and the power supply device can be supplied to a load. As a result, power restoration can be appropriately detected by a low-cost method.

Furthermore, it may be that the detector detects the power restoration by receiving, from the at least one power supply device, a power restoration notification signal indicating that the at least one power supply device has detected that electric power is to be supplied from the power system.

With this, the distribution board can detect the supply state by the power supply device that includes a highly accurate power sensor detecting power restoration. As a result, power restoration can be detected more accurately.

Furthermore, it may be that the detector detects the power restoration by receiving, from a power company via a communication line, a power restoration notification signal indicating that the at least one power supply device has detected that electric power is to be supplied from the power system, the power company managing power supply of the power system.

With this, the distribution board can detect the supply state based on a power restoration notification signal notified from a power company. The power restoration notification signal notified from the power company is information from the power system that is a power supplier, so that the information is accurate. As a result, power restoration can be detected more accurately.

Furthermore, a power control method according to one aspect of the present invention is a power control method performed by a distribution board which supplies, to a load, AC power that is supplied from a power system. The power control method includes: detecting a power outage state in which no electric power is being supplied from the power system; and controlling at least a first switch provided between a power storage and the power system, the power storage including one or more storage batteries and being electrically connected to a predetermined load, wherein when the power outage state is detected in the detecting, and in the controlling, the first switch is turned off to electrically disconnect the power storage and the power system, electric power is supplied to control the distribution board, and discharge power of the one or more storage batteries is supplied to the distribution board.

With this, the advantageous effects substantially the same as those of the distribution board can be obtained.

These general and specific aspects may be implemented using a system, a method, an integrated circuit, a computer program, or a computer-readable recording medium such as a CD-ROM, or any combination of systems, methods, integrated circuits, computer programs, or computer-readable recording media.

Hereinafter, specific descriptions are given of embodiments with reference to the drawings.

Each of the embodiments described below shows a general or specific example. The numerical values, shapes, materials, structural elements, the arrangement and connection of the structural elements, steps, the processing order of the steps etc. shown in the following embodiments are mere examples, and therefore do not limit the scope of the present invention. Among the structural elements in the following embodiments, structural elements not recited in any one of the independent claims are described as arbitrary structural elements.

Embodiment 1

Figure 2:
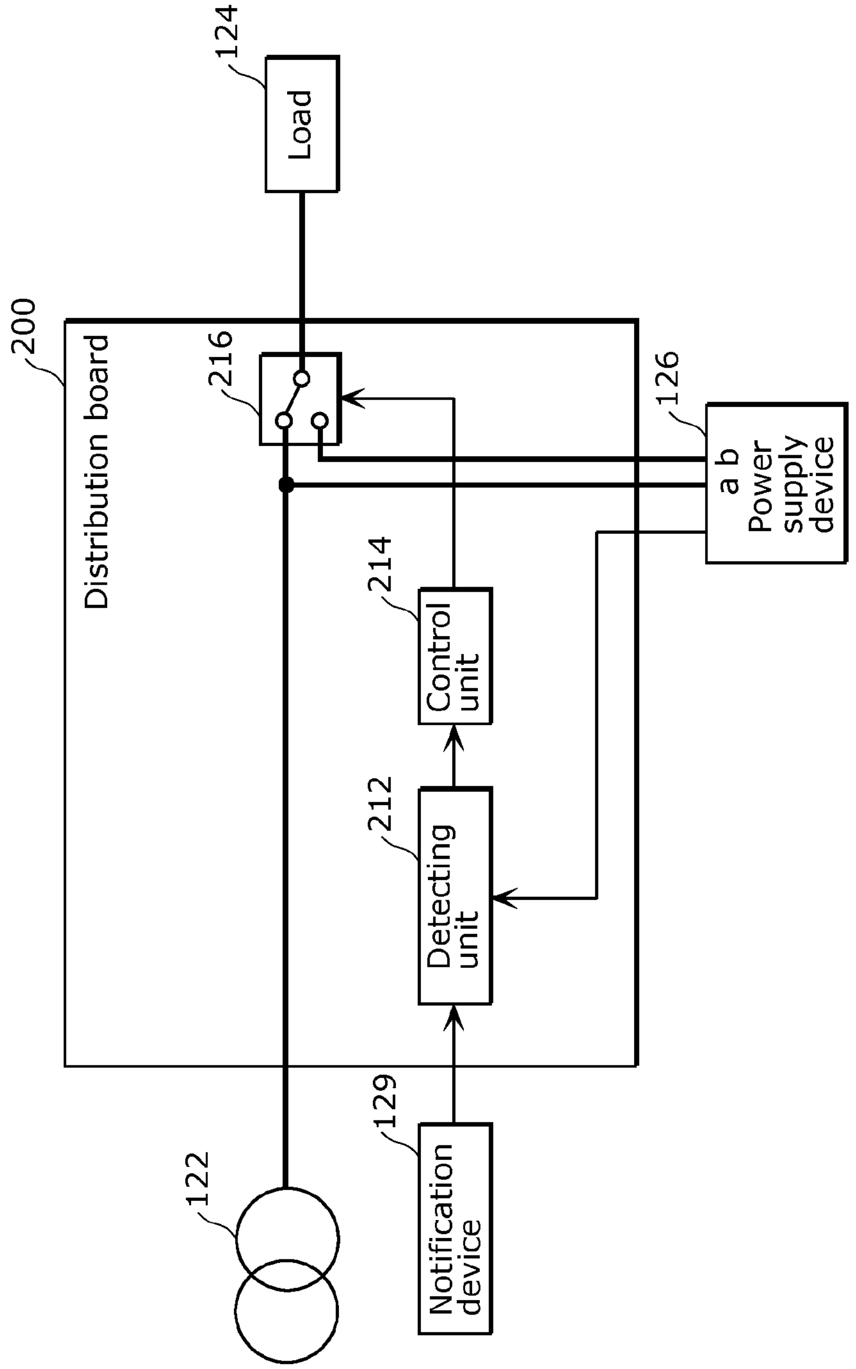
FIG. 2 is a first example of a functional block diagram of a distribution board according to Embodiment 1.

FIG. 2 is a functional block diagram of a distribution board 200 according to Embodiment 1.

The distribution board 200 according to Embodiment 1 receives power supply from a power system 122 and a power supply device 126, and supplies the power to a load 124. The distribution board 200 supplies, to the load 124, the power that is supplied both from the power system 122 and the power supply device 126, in a state where power is supplied from the power system 122 (supply state). On the other hand, in a state where no power is supplied from the power system 122 (power outage state), the distribution board 200 supplies, to the load 124, the power that is supplied from the power supply device 126. Here, such a control is performed that power that is supplied from the power supply device 126 is not provided to the power system 122 (reverse power flow). More specifically, when power supply from the power system 122 stops (power outage), the distribution board 200 automatically detects the power outage, breaks electric connection with the power system 122, and supplies, to the load 124, the power that is supplied from the power supply device 126.

As FIG. 2 illustrates, the distribution board 200 according to Embodiment 1 includes a detecting unit 212, a control unit 214, and a switch 216. The distribution board 200 also includes: a power line (a first power line) connected to the power system 122 to supply, to the load 124, power that is supplied form the power system 122; and a power line (a second power line) for supplying, to the load 124, power that is supplied from the power supply device 126 externally provided. The externally provided power supply device 126 includes an output terminal a for supplying power to the first power line, and an output terminal b for supplying power to the second power line.

The detecting unit 212 detects a power outage state based on a power outage notification signal transmitted from the power supply device 126.

The control unit 214 causes the first power line connecting the power system 122 and the load 124 to be non-conductive, when the detecting unit 212 detects the power outage state. More specifically, the control unit 214 causes the first power line to be non-conductive and the second power line to be conductive by using the switch 216, when the detecting unit 212 detects the power outage state.

The switch 216 is connected to the power system 122, the load 124, and the power supply device 126. More specifically, the switch 216 is located on the first power line and the second power line. The switch 216 switches between a state where the first power line is conductive and the second power line is non-conductive, and a state where the first power line is non-conductive and the second power line is conductive.

The switch 216 may be formed as a single switch element as described above, or may include two or more switch elements. In the case where the switch 216 includes two switches, specifically, the switch 216 includes a switch (a first switch) for switching between conduction and non-conduction of the first power line, and a switch (a second switch) for switching between conduction and non-conduction of the second power line. In this case, the switch 216 switches between two states that are a state where the first switch is conductive and the second switch is non-conductive, and a state where the first switch is non-conductive and the second switch is conductive. It may also be that two switches (the first switch and the second switch) are independently operated, so that the following states can also be established: a state where both the first switch and the second switch are conductive; and a state where both the first switch and the second switch are non-conductive. By doing so, power supply control can be performed more flexibly.

Figure 3:
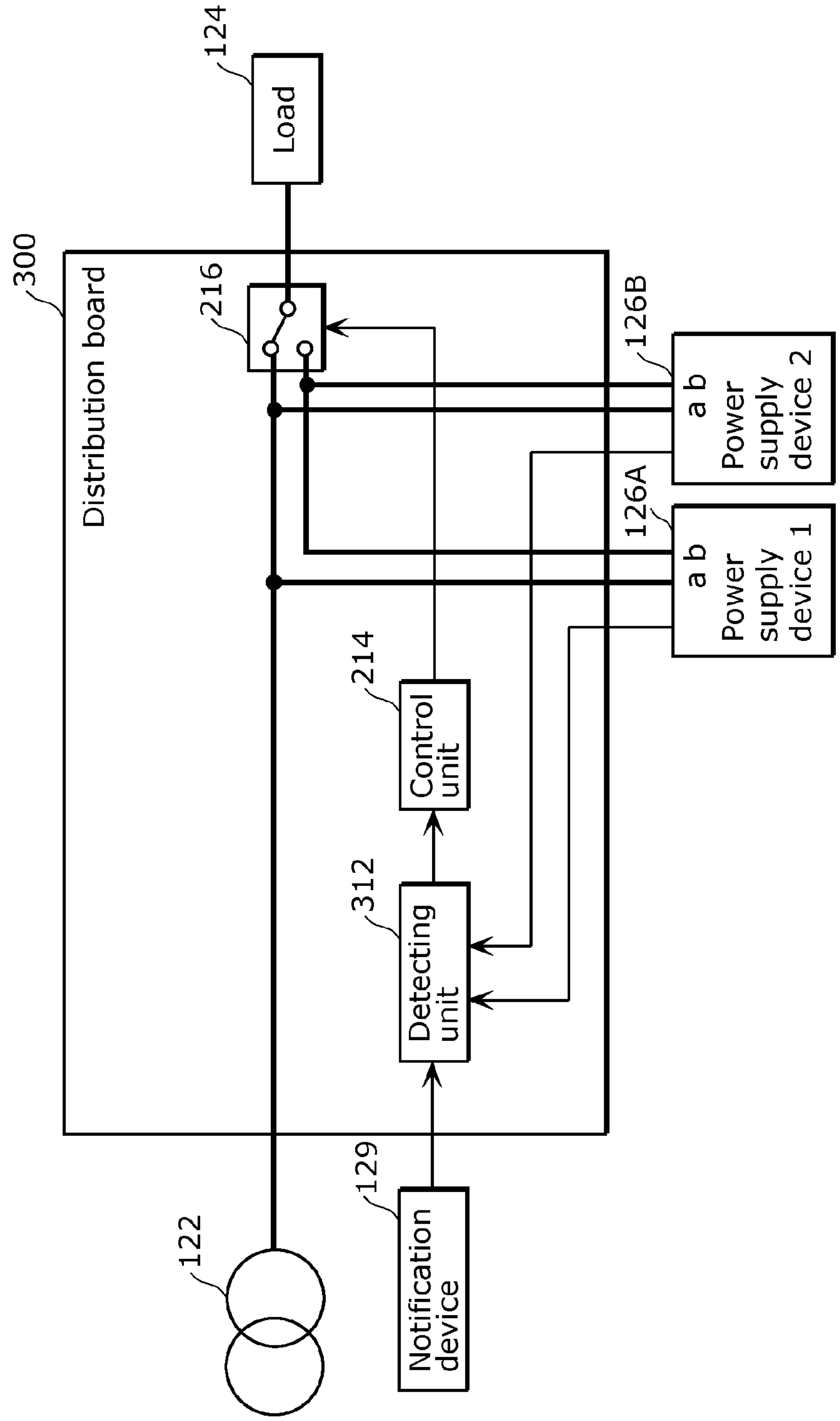
FIG. 3 is a second example of a functional block diagram of a distribution board according to Embodiment 1.

The external power supply device 126 may be a plurality of power supply devices. FIG. 3 illustrates an example where there are a plurality of power supply devices.

FIG. 3 is a second example of a functional block diagram of a distribution board (a distribution board 300) according to Embodiment 1. FIG. 3 illustrates two power supply devices 126A and 126B which are connected to the second power line. Here, the power supply devices 126A and 126B are connected to the second power line at different connecting points. The detecting unit 112 receives a power outage notification signal from each of the power supply devices 126A and 126B, and detects a power outage state based on the received power outage notification signals. The number of the power supply devices is not limited to two, but may be three or more.

Here, such a case may occur that the detecting unit 312 receives power outage notification signals from some of the power supply devices, but does not receive power outage notification signals from the rest of the power supply devices. In such a case, the power outage state is detected by making determination as below.

(1) A Power Supply Device with a Higher Reliability Level Detects Power Outage.

Of the power supply devices each of which has a reliability level predetermined based on the attribute of the power supply device, when the detecting unit 112 receives a power outage notification signal from a power supply device with a highest reliability level, the power outage state is detected.

Here, the reliability level of a power supply device indicates detection accuracy of the power outage state by the power supply device. The reliability level is predetermined based on the attribute of a power supply device. The reliability level may indicate, for example, the level of performance of a power supply device. In other words, it may be that a power supply device with a higher level of performance has a higher reliability level. Furthermore, the reliability level may indicate, for example, newness of the manufacturing date. More specifically, it may be that a power supply device having its manufacturing date closer to the current date has a higher reliability level. Furthermore, the reliability level may indicate, for example, strictness of an obtained certification. More specifically, it may be that a power supply device which has obtained a more strict certification has a higher reliability level.

(2) A Power Supply Device Located Closest to the Power System Detects Power Outage.

When the detecting unit 312 receives a power outage notification signal from a power supply device, among the power supply devices, connected to the second power line at a connecting point closest to the power system 122, the power outage state is detected.

On the power line within a distribution board, a current value at a point closer to the power system 122 includes a relatively lower amount of noise, and a current value at a point farther from the power system 122 includes a relatively greater amount of noise. It is understood that, of the power supply devices, a power supply device connected to the second power line at a connecting point closer to the power system 122 includes a lower amount of noise and detects a power outage state more appropriately.

If a power supply device with a highest reliability level is not being operating for maintenance or the like, a power supply device with a second highest reliability level detects power outage. In other words, of the power supply devices which are performing power supply operations, a power supply device with a highest reliability level detects power outage.

(3) A Larger Number of Power Supply Devices Detect Power Outage (Majority Vote).

The detecting unit 312 detects a power outage state when the detecting unit 312 receives power outage notification signals from, among a plurality of power supply devices, as many power supply devices as there are devices exceeding a predetermined value. The predetermined value may be, for example, half of the number of the power supply devices, or ¼ of the number of the power supply devices. By setting the predetermined value to a smaller value, the detecting unit 112 detects the power outage state when the detecting unit 112 receives power outage notification signals from a smaller number of the power supply devices. In other words, setting the predetermined value to a smaller value allows sensitive detection of the power outage state.

Furthermore, in addition to this method, reliability levels of the power supply devices can also be considered. The detecting unit 312 may detect the power outage state when each power supply device has points ranging from 1 to 5 (a power supply device with an average reliability level has 3 points) and a sum of the points of the power supply devices that have transmitted the power outage notification signals received by the detecting unit 112 exceed a predetermined value. In this way, it is possible to consider both the number of power supply devices that have detected the power outage state and transmitted power outage notification signals, and the reliability levels of the power supply devices.

As described above, the distribution board according to Embodiment 1 can detect the power outage state through detection of the power outage by one or more power supply devices having highly accurate power sensors. When the power outage state is detected, switching of the switch in the distribution board allows control to be performed such that power that is supplied from a power supply device is supplied to a load. Hence, power outage can be appropriately detected by a low-cost method.

Embodiment 2

Figure 4:
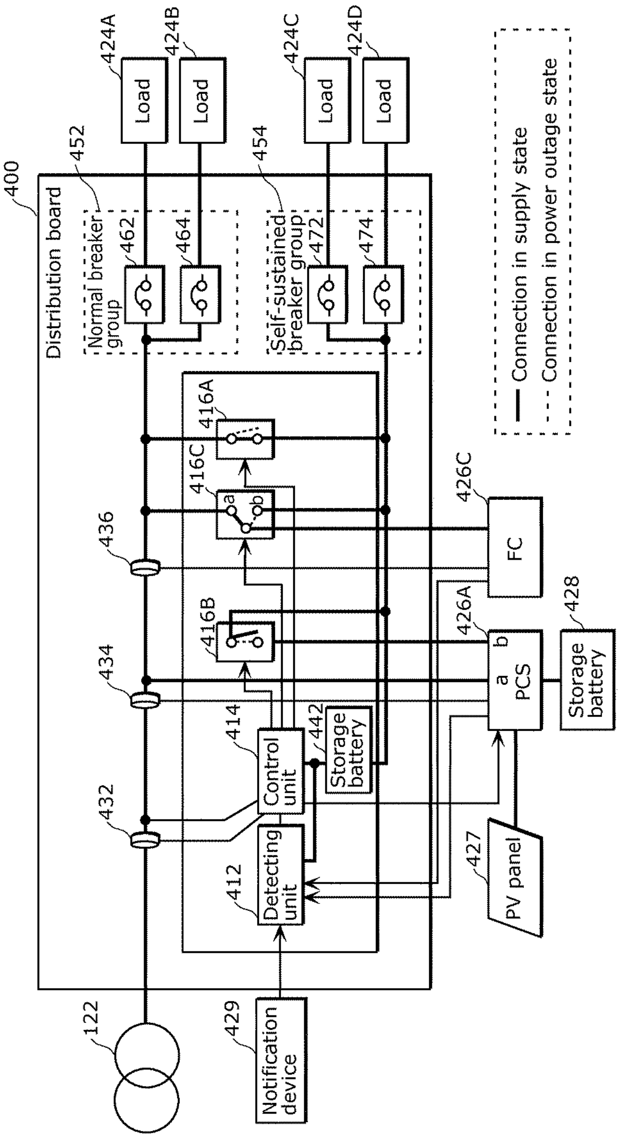
FIG. 4 is a first example of a functional block diagram of a distribution board according to Embodiment 2.

FIG. 4 illustrates a first example of a functional block diagram of a distribution board (distribution board 400) according to Embodiment 2. The distribution board 400 in FIG. 4 illustrates an embodied configuration of the distribution board 300 in FIG. 3.

The distribution board 400 receives power supply from the power system 122, a power conditioner (PCS) 426A serving as a power supply device, and a fuel cell (FC) 426C serving as a power supply device, and supplies the power to loads 424A, 424B, 424C, and 424D. In the state where power is supplied from the power system 122 (supply state), the distribution board 400 supplies power that is supplied from the power system 122 and the power supply devices (PCS426A and FC426C), to the loads 424A, 424B, 424C, and 424D. On the other hand, in the state where no power is supplied from the power system 122 (power outage state), the distribution board 400 supplies power that is supplied from the power supply devices (PCS426A and FC426C) to the loads 424C and 424D. Here, such a control is performed that power that is supplied from the power supply devices (PCS 426A and FC426C) is not provided to the power system 122 (reverse power flow).

When power supply from the power system 122 stops (power outage), the distribution board 400 automatically detects power outage, disconnects connection from the power system 122, and supplies the power that is supplied from the power supply devices to the loads 424C and 424D. When a change is made from the power outage state into the supply state (power restoration), the distribution board 400 is connected to the power system 122, and supplies power that is supplied from the power supply devices to the loads 424A, 424B, 424C, and 424D.

As FIG. 4 illustrates, the distribution board 400 includes a detecting unit 412, a control unit 414, a switch 416A, a switch 416B, a switch 416C, a storage battery 442, current transformers 432, 434, and 436, normal breaker group 452, and self-sustained breaker group 454.

The detecting unit 412 detects a power outage state based on power outage notification signals transmitted from the power supply devices (PCS426A and FC426C). The detecting unit 412 also receives a power outage notification signal or a power restoration notification signal from a power company which manages power supply of the power system 122, via a communication device 429 external to the distribution board 400.

When the detecting unit 412 detects the power outage state, the control unit 414 causes the power line connecting the power system 122 and the loads 424C and 424D to be non-conductive, and causes the power line connecting the power supply devices (PCS426A and FC426C) and the loads 424C and 424D to be conductive. More specifically, the switch 416A is turned off, the switch 416B is turned on, and the switch 416C is set to b (self-sustained side). A PCS operating signal for controlling the PCS426A is transmitted to the PCS426A. The PCS operating signal is a signal for notifying the PCS426A of the supply state or the power outage state.

The switch 416A is a switch for switching between conduction and non-conduction between the self-sustained breaker group 454 and the power system 122.

The switch 416B is a switch for switching whether to cause the PCS426A to output power (self-sustained output).

The switch 416C is a switch for switching the destination of power output from the FC426C between the power system side and the self-sustained side.

The switches 416A, 4166, and 416C correspond to the switch 116 according to Embodiment 1.

The storage battery 442 is a power source for supplying power to the control unit 414 and the detecting unit 412. The storage battery 442 is also capable of supplying power to the loads 424C and 424D through the self-sustained breaker group.

Figure 5:
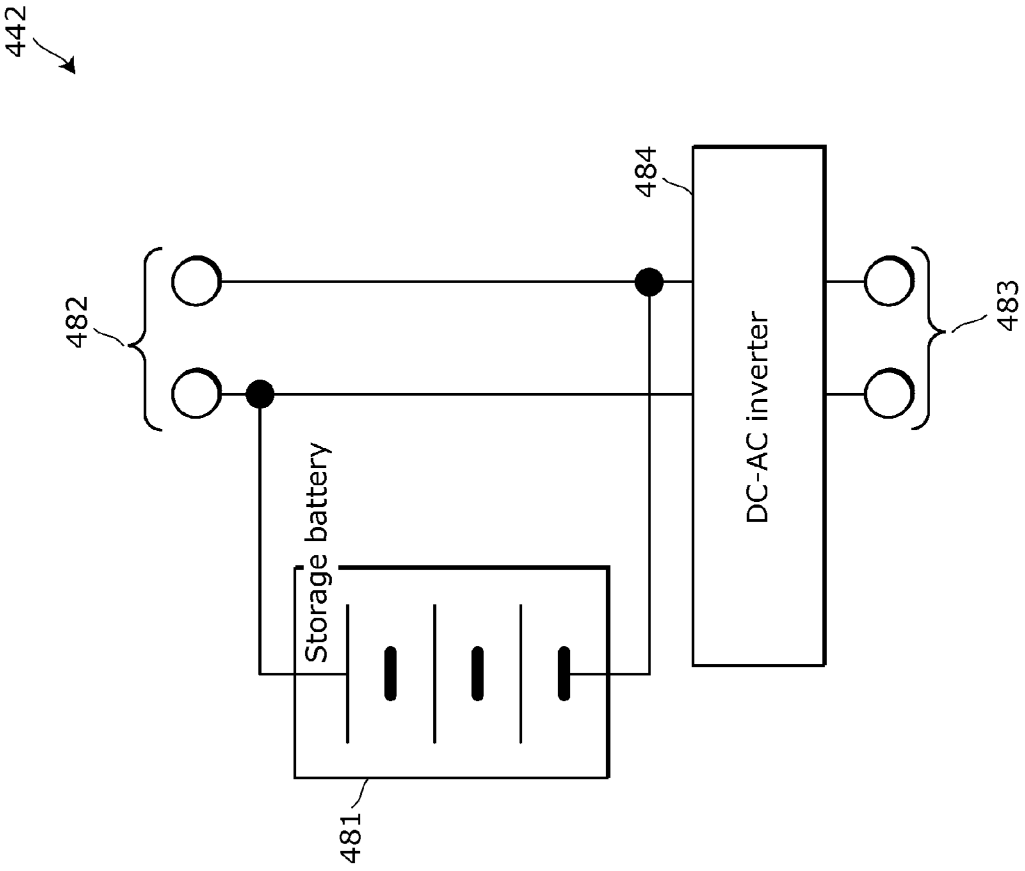
FIG. 5 is a functional block diagram illustrating a configuration of a storage battery according to Embodiment 2.

FIG. 5 is a functional block diagram illustrating a configuration of the storage battery 442 according to Embodiment 2.

Specifically, the storage battery 442 is configured as a power storage unit or a power storage device including one or more storage batteries. As FIG. 5 illustrates, the storage battery 442 includes a storage battery 481, DC terminals 482, AC terminals 483, and a DC/AC inverter 484.

The storage battery 481 stores supplied power and also discharges the stored power.

The DC terminals 482 are electrically connected to the control unit 414, the detecting unit 412, and the storage battery 481.

The AC terminals 483 are electrically connected to the loads 424C and 424D, the switch 416A, the switch 416B, and the switch 416C through the self-sustained breaker group.

The DC/AC inverter 484 performs bidirectional conversion between DC power and AC power. More specifically, the DC/AC inverter 484 converts DC power provided from the storage battery 484 into AC power, and provides the AC power to the AC terminals 483. The DC/AC inverter 484 converts the AC power provided via the AC terminals 483 into DC power, and supplies the DC power to the storage battery 481.

Next, a description is given of power supply in the storage battery 442 with the configuration as described above. The storage battery 442 changes the direction of the power conversion relative to the DC-AC inverter 484 based on the detection result by the detecting unit 412 as to whether the present state is a power outage state. Specific descriptions are given of exemplary operations of: the case where power is supplied from the power system 122 to the distribution board 400; the case of the power outage state; and the case where a change is made from the power outage state into the power restoration state.

In the case where power is supplied from the power system 122 to the distribution board 400, the control unit 414 turns on the switch 416A, turns off the switch 416B, and sets the switch 416C to a (normal side). This establishes electrical connection between the AC terminals 483 and the power system 122.

In this case, in the storage battery 442, the DC/AC inverter 484 converts the AC power that is supplied from the power system 122 via the AC terminals 483 into DC power, and supplies the DC power to the storage battery 481, and charges the storage battery 481. Furthermore, in the storage battery 442, the DC/AC inverter 484 converts the AC power that is supplied from the power system 122 via the AC terminals 483 into DC power, and supplies the DC power to the control unit 414 via the DC terminals 482. The control unit 414 is driven by using the supplied DC power.

In the case of power outage state, the control unit 414 turns off the switch 416A, turns on the switch 416B, and sets the switch 416C to b (self-sustained side). This establishes no electrical connection between the AC terminals 483 and the power system 122.

In this case, the storage battery 442 supplies, to the control unit 414 via the DC terminals 482, the DC power provided from the storage battery 481. Furthermore, in the storage battery 442, the DC/AC inverter 484 converts the DC power provided from the storage battery 481 into AC power, and supplies the AC power to the loads 424C and 424D via the AC terminals 483.

When a change is made from the power outage state into a power restoration state, power is supplied from the power system 122 to the distribution board 400; and thus, the control unit 414 turns on the switch 416A, turns off the switch 416B, and sets the switch 416C to a (normal side). This establishes electrical connection between the AC terminals 483 and the power system 122.

In this case, for a predetermined period after the detecting unit 412 detects power restoration, the storage battery 442 supplies power from the storage battery 481 to the control unit 414 according to the voltage of the power system 122. This is because, in general, it takes time for the voltage of the power system 122 immediately after the power restoration to be stabilized. More specifically, the voltage of the power system 122 is unstable for a predetermined time period after power restoration. Hence, supply of desired current to the control unit 414 may fail.

Power supply to the control unit 414 can be stabilized by supplying power from the storage battery 481 to the control unit 414 according to the voltage of the power system 122 for a predetermined period after the detecting unit 412 detects power restoration. In this case, the storage battery 442 functions as a smoothing capacitor at the time of power restoration. With this, for example, it is possible to avoid an increase in the number of components within the distribution board caused due to separately providing a large-capacity capacitor.

The voltage of the power system 122 can be obtained by, for example, the control unit 414 through the signal line connected between the current transformer 432 and the current transformer 434.

Here, the single DC/AC inverter 484 performs bidirectional conversion between DC power and AC power, but the present invention is not limited to this example. For example, it may be that a DC/AC inverter which converts DC power into AC power, and an AC/DC converter which converts AC power into DC power are separately provided. In this case, according to the detection result by the detecting unit 412 as to whether the present state is power outage, power conversions by the DC/AC inverter and the AC/DC converter are turned on or off. More specifically, when power is being supplied from the power system 122 to the distribution board 400, power conversion by the DC/AC inverter is turned off, and the power conversion by the AC/DC converter is turned on. On the other hand, in the case of the power outage state, the power conversion by the DC/AC inverter is turned on, and the power conversion by the AC/DC converter is turned off.

The current transformers 432, 434, and 436 are sensors for measuring current.

The normal breaker group 452 is a group of breakers which break the circuit when overcurrent or leak is detected, and is connected to normal loads. The normal breaker group 452 includes one or more breakers (462 and 464). The normal breaker group 452 receives power supply in the supply state.

The self-sustained breaker group 454 is a group of breakers which break the circuit when overcurrent or leak is detected, and is connected to emergency loads. The self-sustained breaker group 454 includes one or more breakers (472 and 474). The self-sustained breaker group 454 receives power supply in the supply state and the power outage state.

The PCS 426A is connected to a photovoltaic panel (PV panel) 427 and a storage battery 428. The PCS426A adjusts power to be supplied to the storage battery 428, or power supplied from the storage battery 428. More specifically, the PCS426A converts power to be supplied to the storage battery 428 from AC to DC.

The PCS426A converts power supplied from the storage battery 428 from DC to AC. The PCS 426A includes two terminals (a and b) for supplying power. The PCS 426A supplies power via the terminal a in the supply state, and supplies power via the terminal b in the power outage state. The PCS 426A detects the supply state or the power outage state by receiving a PCS operating signal transmitted from the control unit 414, and switches between terminals for supplying power.

In FIG. 4, the PCS 426A is connected to the PV panel 427 and the storage battery 428, but it may be that each of the PV panel 427 and the storage battery 428 is connected to a power conditioner. Such configuration is described referring to FIG. 6.

Figure 6:
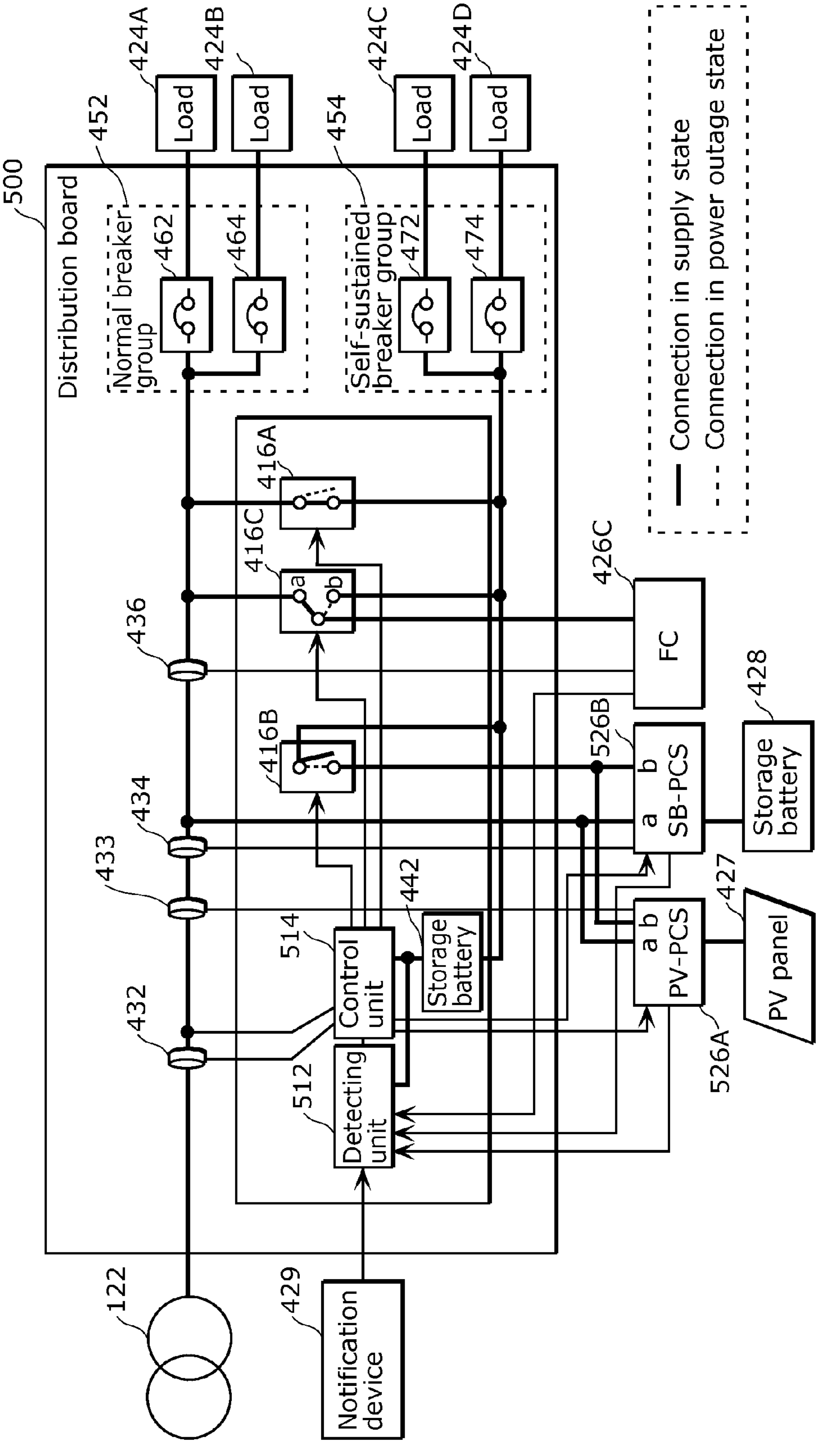
FIG. 6 is a second example of a functional block diagram of the distribution board according to Embodiment 2.

FIG. 6 illustrates a second example of a functional block diagram of a distribution board (distribution board 500) according to Embodiment 2.

FIG. 6 illustrates the distribution board 500 when the PV panel 427 and the storage battery 428 are connected to different power conditioners (PV-PCS 526A and SB-PCS 526B, respectively).

The distribution board 500 includes a current transformer 433 in addition to the structural elements of the distribution board 400 illustrated in FIG. 4. The distribution board 500 includes a detecting unit 512 instead of the detecting unit 412 in the distribution board 400.

The current transformer 433 is a power sensor for measuring current passing through the current transformer 433 and outputting the measurement value (current value). The current transformer 433 notifies the PV-PCS 526A of the measurement value.

The detecting unit 512 detects the power outage state based on power outage notification signals transmitted from the respective power supply devices (PV-PCS 526A, SB-PCS 526B, and FC426C).

The control unit 514 transmits, to the PCS 426A, a PV-PCS operating signal for controlling the PV-PCS 526A. The control unit 514 transmits, to the SB-PCS 526B, a SB-PCS operating signal for controlling the SB-PCS 526B. The detecting unit 512 receives a power outage notification signal or a power restoration notification signal from a power company which manages power supply of the power system 122, via a communication device 429 external to the distribution board 500.

A more detailed description is given of a control method of the control unit 514 in the distribution board 500.

FIG. 7 illustrates a first example of a determination table of the detecting states of the distribution board according to Embodiment 2.

FIG. 7 is for illustrating a power outage determining method performed by the control unit 514 in the case where the reliability levels of the SB-PCS 526B, the PV-PCS 526A, the FC 426C, and the current transformer 432 decrease in this order. FIG. 7 is a determination table used when the control unit 514 determines whether the present state is a power outage state or a supply state when each of the SB-PCS 526B, the PV-PCS 526A, the FC 426C, the power company, and the current transformer 432 sends notification of the detecting state, and the detecting unit 512 receives the notifications. Here, the detecting states include a supply state where power is being supplied (denoted as "supply" in FIG. 7), a power outage state where no power is being supplied (denoted as "power outage" in FIG. 7), and an unknown state where it is unknown whether the present state is a supply state or a power outage state (denoted as "unknown" in FIG. 7). The power outage notification signal transmitted by the power company is received by the detecting unit 512 via the external notification device 429. Specific descriptions are given below.

When the detecting unit 512 receives a notification indicating that the SB-PCS 5266 has detected a power outage state, the control unit 514 determines that the present state is a power outage state.

When the detecting unit 512 receives notifications indicating that the detecting state of the SB-PCS 526B is unknown and that the PV-PCS 526A has detected a power outage state, the control unit 514 determines that the present state is a power outage state.

Moreover, when the detecting unit 512 receives notifications indicating that the detecting states of the SB-PCS 526B and the PV-PCS 526A are unknown, and that the FC 426C has detected a power outage state, the control unit 514 determines that the present state is a power outage state.

When the detecting unit 512 receives notifications indicating that the detecting states of the SB-PCS 526B, the PV-PCS 526A, and the FC 426C are unknown, and that the power company has detected a power outage state, the control unit 514 determines that the present state is a power outage state.

When the detecting unit 512 receives notifications indicating that the detecting states of the SB-PCS 526B, the PV-PCS 526A, the FC 426C, and the power company are unknown, and that the current transformer 432 has detected a power outage state, the control unit 514 determines that the present state is a power outage state.

When the detecting unit 512 receives notifications indicating that the detecting states of the SB-PCS 526B, the PV-PCS 526A, the FC 426C, the power company, and the current transformer 432 are unknown, the control unit 514 determines that the present state is a power outage state.

When the detecting unit 512 receives a notification indicating the supply state from the power company and notifications indicating that the detecting states of the SB-PCS 526B, the PV-PCS 526A, the FC 426C, and the current transformer 432 are in the states other than power outage state, the control unit 514 determines that the present state is a supply state.

It may be that determination is made without using the power outage notification signal transmitted by the current transformer 432. In this case, it may be that the determination similar to the above is made using the portions in FIG. 7 excluding the column 611.

As described above, when a device with a highest reliability level detects a power outage state among devices excluding devices having unknown detecting states, the control unit 514 determines that the present state is a power outage state.

FIG. 8 illustrates a second example of a determination table of the detecting state of the distribution board according to Embodiment 2.

FIG. 8 is for illustrating a power outage determination method performed by the control unit 514 when the PV-PCS 526A, the SB-PCS 526B, the FC 426C, and the current transformer 432 are connected to the power line where the connection points on the power line are located closer to the power system in the mentioned order.

When the detecting unit 512 receives a notification indicating that the PV-PCS 526A has detected a power outage state, the control unit 514 determines that the present state is a power outage state.

When the detecting unit 512 receives notifications indicating that the detecting state of the PV-PCS 526A is unknown and that the SB-PCS 526B has detected a power outage state, the control unit 514 determines that the present state is a power outage state.

When the detecting unit 512 receives notifications indicating that the detecting states of the PV-PCS 526A and the SB-PCS 526B are unknown, and that the FC 426C has detected a power outage state, the control unit 514 determines that the present state is a power outage state.

When the detecting unit 512 receives notifications indicating that the detecting states of the PV-PCS 526A, the SB-PCS 526B, and the FC 426C are unknown and that the current transformer 432 has detected a power outage state, the control unit 514 determines that the present state is a power outage state.

When the detecting unit 512 receives notifications indicating that the detecting states of the PV-PCS 526A, the SB-PCS 526B, the FC 426C, and the current transformer 432 are unknown, the control unit 514 determines that the present state is a power outage state.

When the detecting unit 512 receives notifications indicating that the detecting states of the PV-PCS 526A, the SB-PCS 526B, and the FC 426C are unknown and that the current transformer 432 has detected a supply state, the control unit 514 determines that the present state is a supply state.

When the detecting unit 512 receives the notification indicating that the detecting states of the PV-PCS 526A and the SB-PCS 526B are unknown, that the FC 426C has detected a supply state, and that the current transformer 432 is in a state other than a power outage state, the control unit 514 determines that the present state is a supply state.

When the detecting unit 512 receives notifications indicating that the detecting state of the PV-PCS 526A is unknown, that the SB-PCS 526B has detected a supply state, and that the FC 426C and the current transformer 432 are in the states other than the power outage state, the control unit 514 determines that the present state is a supply state.

When the detecting unit 512 receives notifications indicating that the PV-PCS 526A has detected a supply state, and that the SB-PCS 526B, the FC 426C, and the current transformer 432 are in the states other than the power outage state, the control unit 514 determines that the present state is a supply state.

It may be that determination is made without using the power outage notification signal transmitted by the current transformer 432. In this case, it may be that the determination similar to the above is made using the portions in FIG. 8 excluding the column 711 and the row 712.

The above describes a method of detecting the detecting states performed by the control unit 514 based on the power outage determination table. Here, any other determination methods of the detecting states performed by the control unit 514 that do not use the power outage determination table can be used in a similar manner as long as the method provides the substantially same effects.

Figure 9:
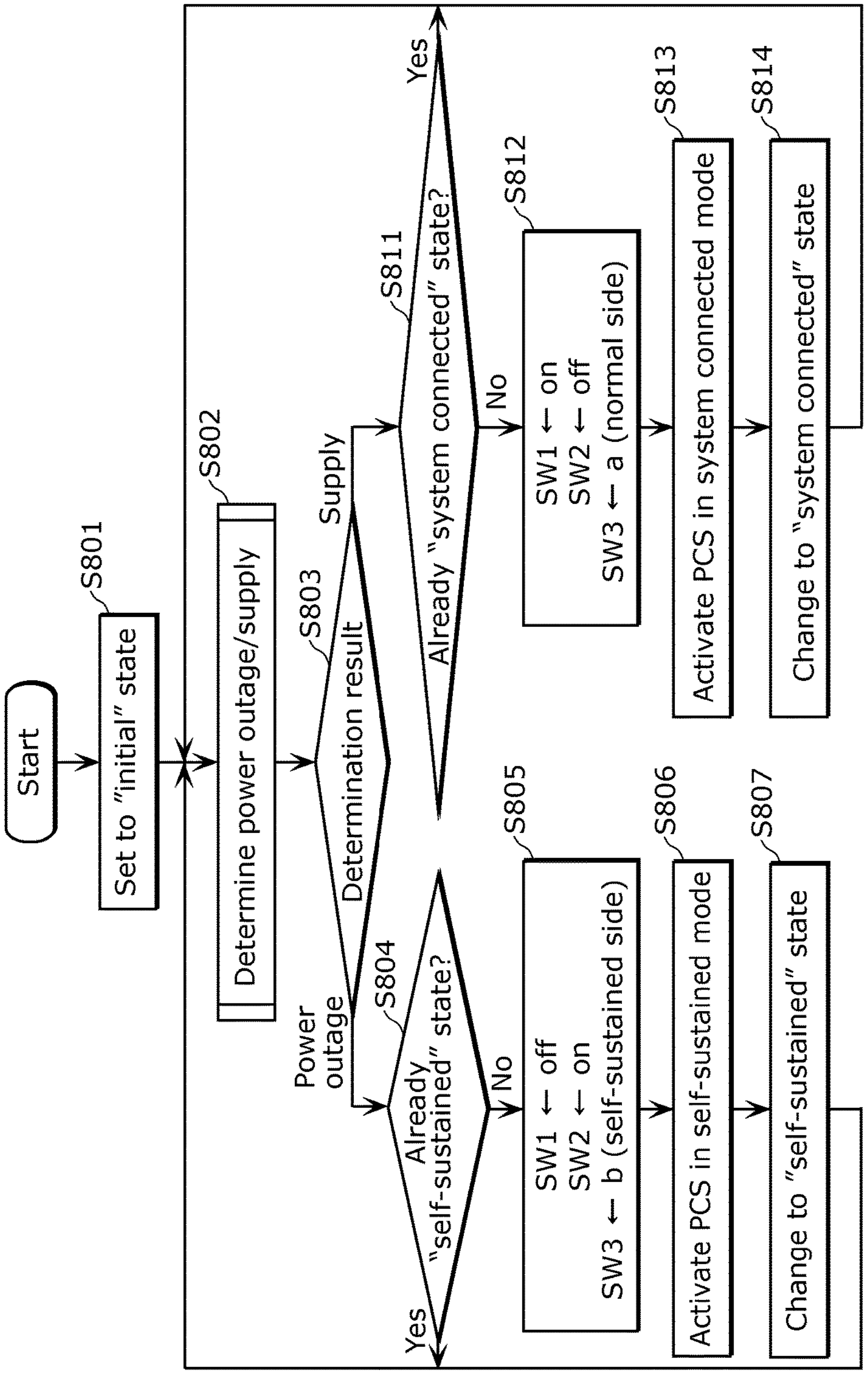
FIG. 9 is a flowchart of an electric power control method performed by the distribution board according to Embodiment 2.

FIG. 9 is a flowchart of an electric power control method performed by a distribution board according to Embodiment 2.

As FIG. 9 illustrates, in the power control method performed by the distribution board according to Embodiment 2, first, the control state of the distribution board is set to initial state (Step S801).

Next, determination of the detecting state (power outage state, supply state, or unknown) is made (Step S802). This determination will be described in detail later.

Next, processing is branched based on the determination result of the detecting state in Step S802 (Step 803).

When the determination result of the detecting state in Step S802 shows that the present state is a power outage state, it is determined whether the control state of the distribution board is already in the self-sustained mode (Step S804). Here, the self-sustained state refers to a state where the distribution board is receiving power from at least one of the PV-PCS 526A, the SB-PCS 5266, and the FC 426C, and the received power is being supplied to the self-sustained breaker group 454. When it is determined that the control state is already in the self-sustained state, processing continues at Step S802.

When it is determined in Step S804 that the control state is not the self-sustained state, the switches 416A, 4166 and 416C are switched to establish a circuit in the self-sustained state in the distribution board (Step S805). More specifically, the control unit 514 turns off the switch 416A (SW1), turns on the switch 4166 (SW2), and sets the switch 416C (SW3) to b (self-sustained side).

Next, the power conditioners (PV-PCS 526A and the SB-PCS 5266) are activated in the self-sustained mode (Step S806).

Next, the control state of the distribution board is changed to the self-sustained state (Step S807).

When the Step S807 is completed, the processing returns to Step S802.

On the other hand, when the determination result of the detecting state in Step S802 shows that the present state is a supply state, it is determined whether the control state of the distribution board is already in the system connected state (Step S811). Here, the system connected state refers to the state where the distribution board is receiving power from the power system 122 and at least one of the PV-PCS 526A, the SB-PCS 526B, and the FC 426C, and supplying the received power to the normal breaker group 452 and the self-sustained breaker group 454. When it is determined that the control state is already in the system connected state, processing continues at Step S802.

When it is determined in Step S811 that the control state is not the system connected state, the switches 416A, 416B, and 416C are switched to establish a circuit in the system connected state within the distribution board (Step S812). More specifically, the control unit 514 turns on the switch 416A (SW1), turns off the switch 416B (SW2), and sets the switch 416C (SW3) to a (normal side).

Next, the power conditioners (PV-PCS 526A and the SB-PCS 526B) are activated in the system connected mode (Step S813).

Next, the control state of the distribution board is changed to the system connected state (Step S814).

When the Step S814 is completed, the processing returns to Step 802.

With the power control method performed by the distribution board as described above, it is possible to change the control state (self-sustained state or system-connected state) of the distribution board, based on the detecting state (power outage state or supply state) of the distribution board.

Figure 10:
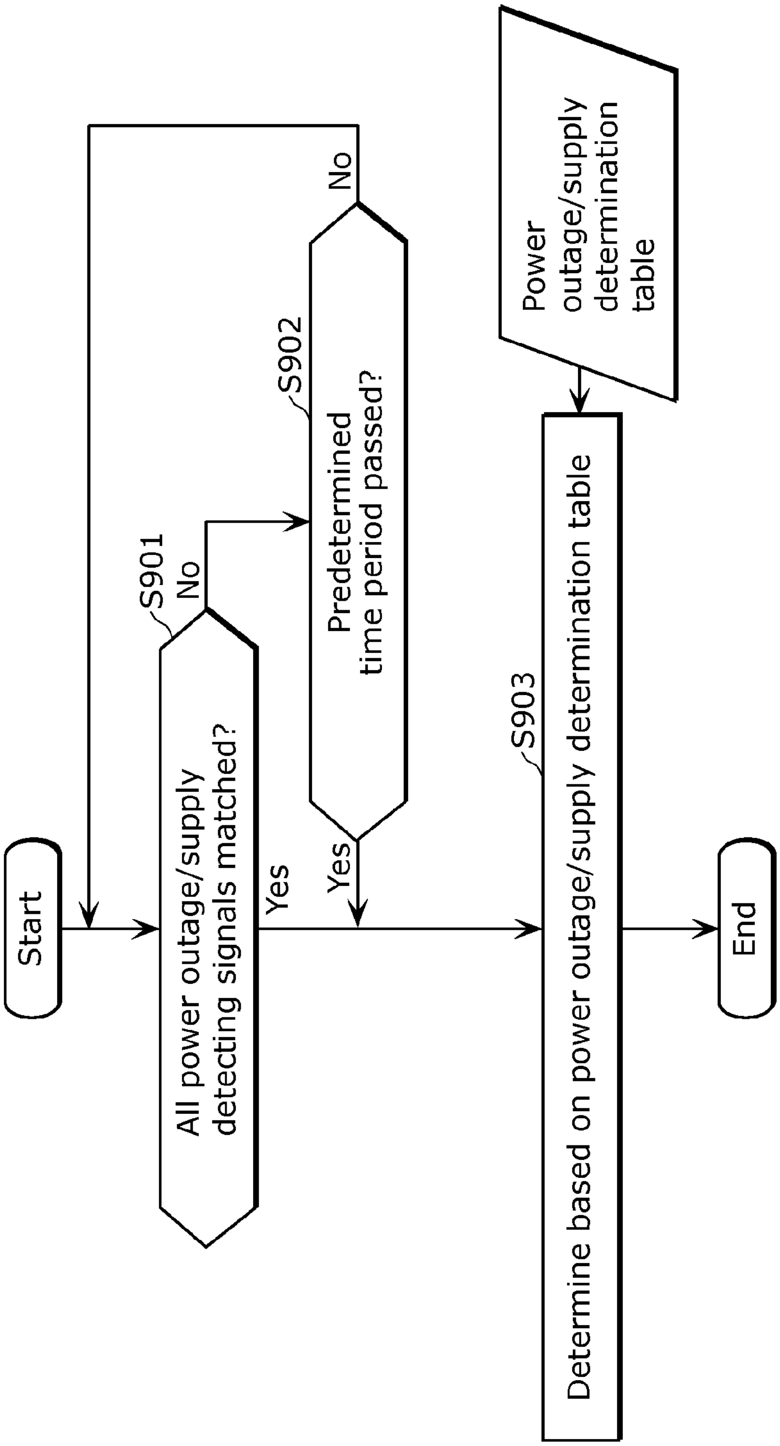
FIG. 10 is a flowchart of a method of determining a detecting state of the distribution board according to Embodiment 2.

FIG. 10 is a flowchart of a method of determining a detecting state of a distribution board according to Embodiment 2. The flowchart of the determination method illustrated in FIG. 10 describes the processing in Step S802 in FIG. 9 in detail.

First, the detecting unit 512 receives the detecting states (power outage state and supply state) of all the power supplies (power supply devices and the power system 122), and the control unit 514 determines whether or not the detected states match (Step S901). The detecting unit 512 receives the detecting states of the power supply devices by receiving, for example, power outage notification signals that are signals transmitted when the power supply devices detect the power outage state. Moreover, the detecting unit 512 receives the detecting states of the power supply devices by receiving, via communication lines, power outage notification signals that are signals transmitted by a power company when the power system 122 is in the power outage state.

When it is determined in Step S901 that all of the detecting states of the power supplies match, the processing proceeds to determination of the detecting state of the distribution board (Step S903).

When it is determined in Step S901 that the detecting states of the power supplies do not match, it is determined whether a predetermined period has passed (Step S902). When it is determined that a predetermined period has not passed, processing continues at Step S901. When it is determined that a predetermined period has passed, processing proceeds to the determination of the detecting state of the distribution board (Step S903). Here, the predetermined period is, for example, a period of one second, approximately. As a result of Step S902, determination as to whether the detecting states match is repeatedly performed till the detecting states received in Step S901 match and a predetermined period has passed. Power supply is unstable, for example, immediately after the supply from the power system 122 stops, and thus, it is expected that the detecting states of the power supplies do not match. In such a case, too, the detecting state after the stability recovered can be received by waiting for a predetermined period to pass.

A description is given now of the determination of the detecting state of the distribution board (Step S903). First, when the detecting states received from respective power supplies by the detecting unit 512 match and the matched detecting states indicate a supply state or a power outage state, the detecting state received by the detecting unit 512 is determined to be the detecting state of the distribution board.

Next, when the detecting states received from respective power supplies by the detecting unit 512 do not match, the detecting state of the distribution board is determined based on the determination table of the detecting state. More specifically, the detecting state of the distribution board is determined with use of the determination table illustrated in FIG. 7 and FIG. 8.

With this, when a plurality of power supply devices are connected to a distribution board, the distribution board according to Embodiment 2 can detect power outage more accurately. The amount of noise included in power supplied from the power system increases as a distance on the power line from the power system increases. Hence, a power supply device connected at a connecting point closer to the power system can detect the power outage state more accurately. As a result, the power outage state can be detected more accurately.

With this, when a plurality of power supply devices are connected to a distribution board, power outage can be detected more accurately. This is because a power outage notification signal received from a power supply device having a higher reliability level is considered to be more accurate. As a result, the power outage state can be detected more accurately.

With this, switches in the distribution board are switched when it is detected that the power system has been changed from the power outage state to the supply state, so that control can be performed such that power supplied both from the power system and the power supply device can be supplied to a load. As a result, power restoration can be appropriately detected by a low-cost method.

With this, the distribution board can detect the supply state by the power supply device which includes a highly accurate power sensor detecting power restoration. As a result, power restoration can be detected more accurately.

With this, the distribution board can detect the supply state based on a power restoration notification signal notified from a power company. The power restoration notification signal notified from the power company is information from the power system that is a power supplier, so that the information is accurate. As a result, power restoration can be detected more accurately.

Embodiment 3

In Embodiment 3, in addition to the power outage state and the supply state for the detecting states determined by the control unit, descriptions are given of an example of a power control method performed by a distribution board when a suspected power outage state can occur. The suspected power outage state refers to a state where a probability of power outage is lower than that of the power outage state but is still high. For example, when the determination table in FIG. 7 or FIG. 8 has a predetermined number of "unknown" or more, it can be considered to be the suspected power outage state.

In the power outage state, the distribution board needs to perform control such that the power supplied from the power supply devices is not output to the power system 122 (reverse power flow). The distribution board according to Embodiment 3 performs control such that reverse power flow do not occur in the power outage state and also in the state where the probability of power outage state is high. On the other hand, when not in the power outage state, the distribution board supplies power both to loads (424A and 424B) connected to the normal breaker group 452, and loads (424C and 424D) connected to the self-sustained breaker group 454.

Figure 11:
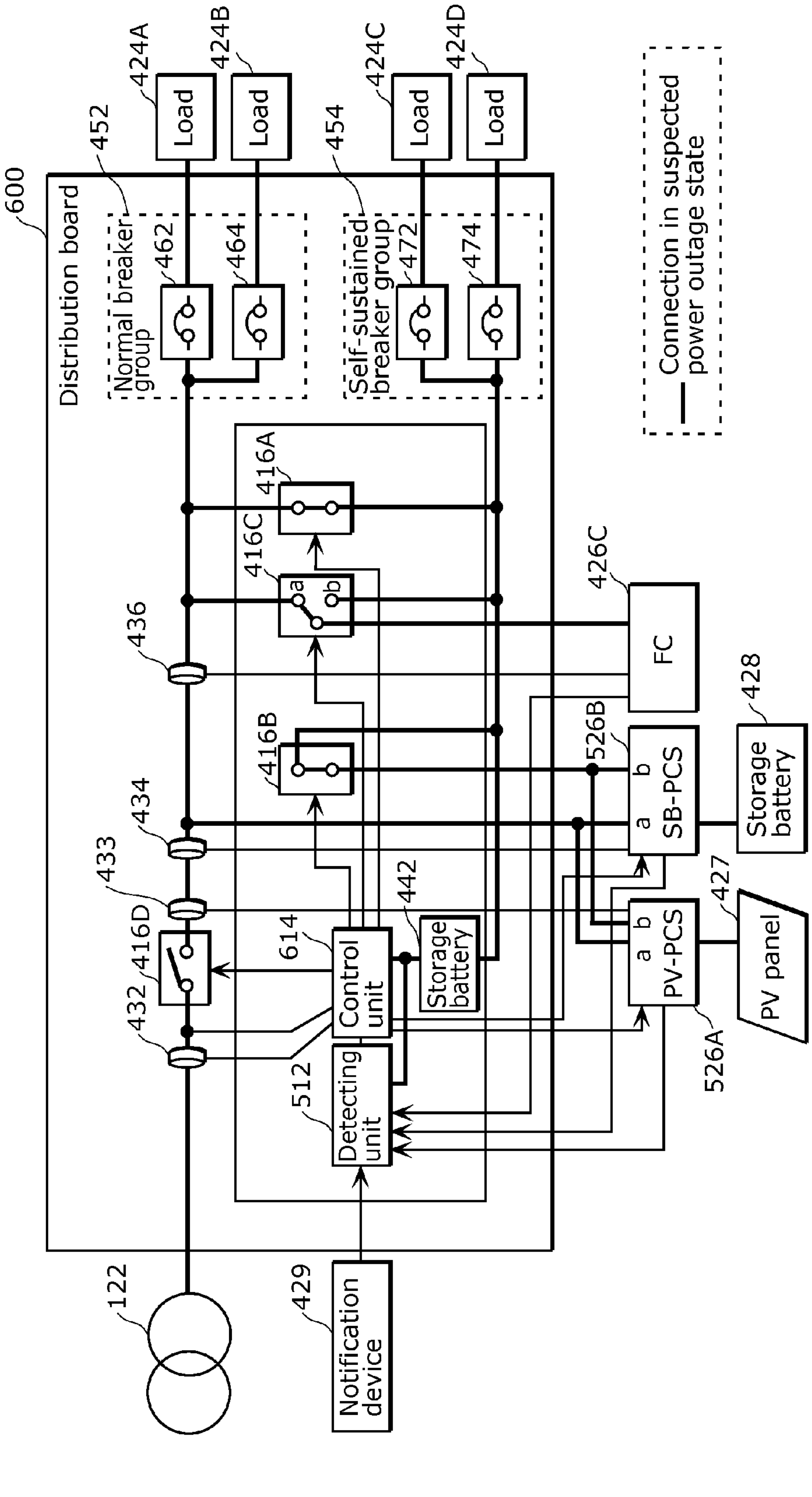
FIG. 11 is an example of a functional block diagram of a distribution board according to Embodiment 3.

FIG. 11 is an example of a functional block diagram of a distribution board 600 according to Embodiment 3.

The functional block configuration of the distribution board according to Embodiment 3 includes a switch 416 D in addition to the functional block configuration according to Embodiment 2. Furthermore, compared to Embodiment 2, the control unit 614 controls a switch 416A, a switch 416B, a switch 416C in a different manner (different switching method).

The switches 416A, 416B, and 416C and 416D correspond to the switch 116 according to Embodiment 1.

When the detecting unit 512 detects the suspected power outage state, the control unit 614 causes the power line connecting the power system 122 and the loads 424A to 424D to be nonconductive, and causes the power line connecting the power supply devices (PCS426A and FC426C) and the loads 424A to 424D to be conductive. More specifically, the control unit 614 turns on the switches 416A and 416B, sets the switch 416C to a (normal side), and turns off the switch 416D.

Figure 12:
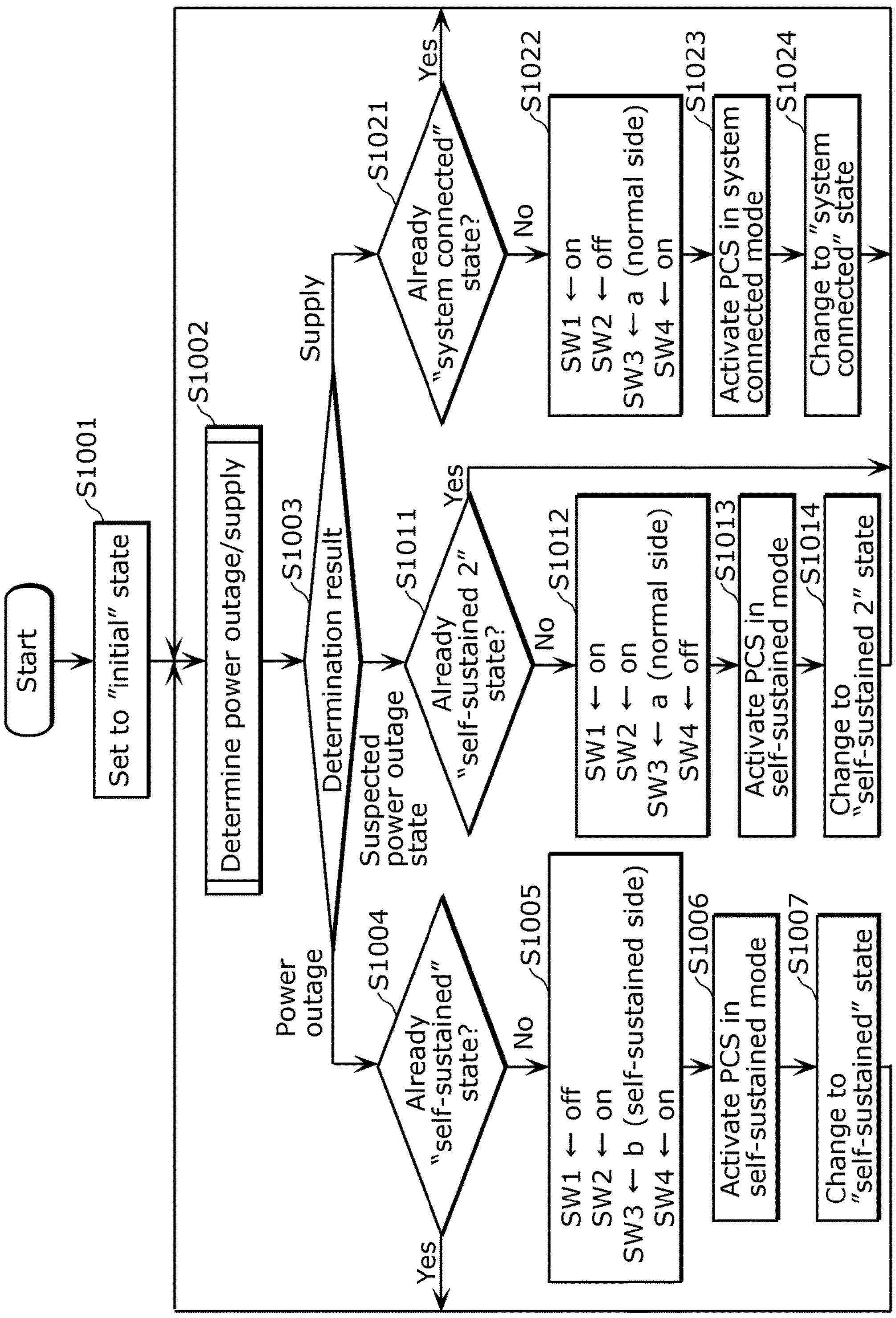
FIG. 12 is a flowchart of an electric power control method performed by the distribution board according to Embodiment 3.

FIG. 12 is a flowchart of an electric power control method performed by the distribution board 600 according to Embodiment 3.

In the power control method performed by the distribution board 600 according to Embodiment 3, the case of suspected power outage state is added to the branching point of Step S803 in the power control method according to Embodiment 2. Hereinafter, detailed descriptions are given below. In the power control method performed by the distribution board 600 according to Embodiment 3 illustrated in FIG. 12, Steps S1001 to S1007, and S1021 to S1024 are substantially the same as Steps S801 to S807 and S811 to 814 in the power control method according to Embodiment 2. Hence, the descriptions thereof are not given.

When the determination result of the detecting state in Step S1002 shows that the present state is a suspected power outage state, it is determined whether the control state of the distribution board is already in the self-sustained operating state 2 (Step S1011). Here, the self-sustained operating state 2 refers to a state where the distribution board is receiving power from at least one of the PV-PCS 526A, the SB-PCS 526B, and the FC 426C, and is supplying the received power to the normal breaker group 452 and the self-sustained breaker group 454. When it is determined that the control state is already in the self-sustained state 2, processing continues at Step S1002.

When it is determined in Step S1011 that the control state is not in the self-sustained state 2, the switches 416A, 416B, 416C, and 416D are switched to establish a circuit in the self-sustained state 2 within the distribution board (Step S1012). More specifically, the control unit 614 turns on the switches 416A (SW1) and 416B (SW2), sets the switch 416C (SW3) to a (normal side), and turns off the switch 416D (SW4).

Next, the power conditioners (PV-PCS 526A and the SB-PCS 526B) are activated in a self-sustained mode (Step S1013).

Next, the control state of the distribution board is changed to the self-sustained state 2 (Step S1014).

When Step S1014 is completed, the processing returns to Step 1002.

In such a manner, the distribution board 600 according to Embodiment 3 can perform appropriate power control not only in the power outage state and the supply state, but also in the suspected power outage state.

As described in each embodiment above, according to the present invention, the power outage state or power restoration state of the power system is detected by the power supply devices detecting the power outage state or power restoration state. Since the power supply devices include highly accurate power sensors, highly accurate detection can be performed by the above method.

In each of the embodiments above, each structural element may be configured by dedicated hardware, or may be implemented by executing a software program suitable for the structural element. Each structural element may be achieved by a program executing unit, such as a central processing unit (CPU) or a processor reading and executing a software program recorded onto a recording medium such as a hard disk or a semiconductor memory. Here, the software which achieves the distribution board or the like according to each of the embodiments above is, for example, a program as described below.

The program causes a computer execute a power control method performed by a distribution board which supplies, to a load, AC power that is supplied from a power system. The method includes: detecting a power outage state in which no electric power is being supplied from the power system; and controlling at least a first switch provided between a power storage unit and the power system, the power storage unit including one or more storage batteries and being electrically connected to a predetermined load, wherein when the power outage state is detected in the detecting, and in the controlling, the first switch is turned off to electrically disconnect the power storage unit and the power system, electric power is supplied to control the distribution board, and discharge power of the one or more storage batteries is supplied to the distribution board.

Although the distribution board according to one or more embodiments have been described based on the embodiments, the present invention is not limited to these embodiments. Various modifications to the embodiments that may be conceived by those skilled in the art and combinations of structural elements in different embodiments may be included within the scope of one or more aspects of the present invention, without departing from the spirit of the present invention.

INDUSTRIAL APPLICABILITY

According to the present invention, power outage state is appropriately detected to be switched into a self-sustained state, and wider use of power for operating a distribution board is achieved. The present invention is useful, for example, in a distribution board, a power control method, a power supply system including the distribution board, and household equipment which includes the distribution board.

REFERENCE SIGNS LIST

100, 200, 300, 400, 500, 600 Distribution board
111, 212, 312, 412, 512 Detecting unit
112, 432, 433, 434, 436 Current transformer
114, 214, 414, 514 614 Control unit
116, 216, 416A, 416B, 416C, 416D Switch
122 Power system
124, 424A, 424B, 424C, 424D Load
126 Power supply device
126A Power supply device 1
126B Power supply device 2
426A PCS
426C FC
427 PV panel
428 Storage battery

429 Notification device
442 Storage battery
452 Normal breaker group
454 Self-sustained breaker group
462, 464, 472, 474 Breaker
481 Storage battery
482 DC terminal
483 AC terminal
484 DC/AC inverter
526A PV-PCS
526B SB-PCS

The invention claimed is:

1. An apparatus comprising:

a power line configured to supply, to a predetermined load, AC power from a power system;

a power storage including one or more storage batteries and configured to be electrically connected to the predetermined load;

a detector configured to detect a power outage state in which no electric power is being supplied from the power system;

a first switch configured to be electrically connectable between the power system, the power storage, and the predetermined load; and a controller configured to be electrically connected between the switch and the detector and control the operation of at least the first switch, wherein when the detector detects the power outage state, the controller is configured to control the first switch so as to electrically disconnect the power system from the predetermined load, and electrically connect the power storage to the predetermined load, the one or more storage batteries in the power storage being configured to supply electric power to the controller and the predetermined load, wherein the apparatus is further configured to supply, to the load, AC power that is supplied from at least one power supply device externally provided, the at least one power supply device includes a first power output terminal and a second power output terminal, and is configured to supply electric power to the apparatus via the first power output terminal during a power outage, and supply electric power to the apparatus via the second power output terminal during a normal period, the apparatus further comprises a second switch for switching between conduction and non-conduction between the at least one power supply device and the predetermined load, the first switch is further configured to switch between conduction and non-conduction between the power system and the predetermined load, the detector is configured to detect the power outage state by receiving, from the at least one power supply device, a power outage notification signal indicating that the at least one power supply device has detected that no electric power is to be supplied from the power system, when the detector receives the power outage notification signal, the controller is configured to control the first switch to block electric power from the power system, and control the second switch to electrically connect the first power output terminal of the at least one power supply device and the predetermined load, the second power output terminal of the at least one power supply device is configured to be electrically connected to the predetermined load via the first switch, when the first switch is controlled on, the at least one power supply device is electrically connected to the predetermined load, and when the first switch is controlled off, the at least one power supply device is electrically disconnected from the predetermined load.

2. The apparatus according to claim 1, wherein the power storage further includes:

a DC terminal configured to be electrically connected to the controller and the one or more storage batteries;

an AC terminal configured to be electrically connected to the predetermined load and the first switch; and a DC/AC inverter configured to convert DC power provided from the one or more storage batteries into AC power, and provide the AC power to the AC terminal, and during power outage, the power storage is configured to supply, to the controller via the DC terminal, the DC power provided from the one or more storage batteries, the DC/AC inverter is configured to convert the DC power provided from the one or more storage batteries into AC power, and the power storage is configured to supply the AC power to the predetermined load via the AC terminal.

3. The apparatus according to claim 2, wherein the DC/AC inverter is further configured to convert AC power into DC power to enable bi-directional conversion between DC power and AC power, and when electric power is being supplied from the power system to the apparatus, the controller is configured to control the first switch to electrically connect the AC terminal and the power system, and the DC/AC inverter is configured to convert the AC power supplied from the power system via the AC terminal into DC power, and the power storage is configured to supply the DC power to the one or more storage batteries to charge the one or more storage batteries.

4. The apparatus according to claim 2, wherein when electric power is being supplied from the power system to the apparatus, the controller is configured to control the first switch to electrically connect the AC terminal and the power system, the DC/AC inverter is configured to convert the AC power supplied from the power system via the AC terminal into DC power, and the power storage is configured to supply the DC power to the controller via the DC terminal, and the controller is driven with the DC power supplied from the power storage.

5. The apparatus according to claim 3, wherein the detector is further configured to detect power restoration indicating a change from the power outage state to a supply state in which electric power is being supplied from the power system, and the power storage is configured to supply, according to a voltage of the power system, electric power from the power storage to the controller for a predetermined period after the detector detects the power restoration.

6. The apparatus according to claim 1, wherein the apparatus is configured to be connected to a normal load and an emergency load, the predetermined load is the emergency load, and the power storage is configured to supply, to the emergency load, discharge power of the power storage during power outage.

7. The apparatus according to claim 3, wherein the apparatus is configured to be connected to a normal load and an emergency load, the predetermined load is the emergency load, and when electric power is being supplied from the power system to the apparatus, the controller is configured to supply, to the normal load, the electric power that is supplied from the power system.

8. The apparatus according to claim 1, wherein the power line is configured to be electrically connected to two or more power supply devices among the at least one power supply device at different connecting points, and the detector is configured to detect the power outage state by receiving the power outage notification signal from one of the two or more electric power supply devices that is connected to the power line at a connecting point closest to the power system.

9. The apparatus according to claim 1, wherein when the at least one power supply device comprises a plurality of power supply devices, the detector is configured to detect the power outage state by receiving the power outage notification signal from one of the power supply devices that has a reliability level highest among plural reliability levels, each of the plural reliability levels being predetermined for a different one of the power supply devices based on an attribute of the different one of the power supply devices.

10. The apparatus according to claim 1, wherein the detector is configured to detect power restoration indicating a change from the power outage state to a supply state in which electric power is being supplied from the power system, and when the detector detects the power restoration, the controller is configured to control the second switch to establish non-conduction between the first power output terminal of the at least one power supply device and the predetermined load, and control the first switch to establish conduction between the power system and the predetermined load.

11. The apparatus according to claim 10, wherein the detector is configured to detect the power restoration by receiving, from the at least one power supply device, a power restoration notification signal indicating that the at least one power supply device has detected that electric power is to be supplied from the power system.

12. The apparatus according to claim 10, wherein the detector is configured to detect the power restoration by receiving, from a power company via a communication line, a power restoration notification signal indicating that the at least one power supply device has detected that electric power is to be supplied from the power system, the power company managing power supply of the power system.

13. A power control method performed by an apparatus which supplies, to a load, AC power that is supplied from a power system, the power control method comprising:

detecting a power outage state in which no electric power is being supplied from the power system; and controlling, using a controller, at least a first switch, the first switch configured to be electrically connectable between a power storage, the power system, and a predetermined load, the power storage including one or more storage batteries, wherein when the power outage state is detected, the first switch is controlled to electrically disconnect the power system from the predetermined load, and electrically connect the power storage to the predetermined load so that power of the one or more storage batteries in the power storage is supplied to the controller and the predetermined load, wherein the method further comprises:

supplying, to the load, AC power that is supplied from at least one power supply device externally provided, the at least one power supply device including a first power output terminal and a second power output terminal, supplying electric power to the apparatus via the first power output terminal during a power outage, and supplying electric power to the apparatus via the second power output terminal during a normal period, and the method further comprises:

switching, using a second switch, between conduction and non-conduction between the at least one power supply device and the predetermined load, switching, using the first switch, between conduction and non-conduction between the power system and the predetermined load, detecting, using the detector, the power outage state by receiving, from the at least one power supply device, a power outage notification signal indicating that the at least one power supply device has detected that no electric power is to be supplied from the power system, when the detector receives the power outage notification signal, controlling, using the controller, the first switch to block electric power from the power system and the second switch to electrically connect the first power output terminal of the at least one power supply device and the predetermined load, electrically connecting, using the second power output terminal of the at least one power supply device, to the predetermined load via the first switch, when the first switch is controlled on, electrically connecting the at least one power supply device to the predetermined load, and when the first switch is controlled off, electrically disconnecting the at least one power supply device from the predetermined load.

* * * * *